United States Patent Office 3,075,933
Patented Jan. 29, 1963

3,075,933
INHIBITION OF GLYCERIDE OIL MODIFIED VINYL TOLUENE ALKYD VARNISH GELLING
Fred J. Lowes, Jr., Midland, Mich., assignor to The Dow Chemical Company, Midland, Mich., a corporation of Delaware
No Drawing. Filed Nov. 12, 1959, Ser. No. 852,165
4 Claims. (Cl. 260—22)

The present invention relates to a method of inhibiting the gelling of vinyl toluene alkyd varnishes and to compositions of vinyl toluene alkyd varnishes containing a gelation inhibitor.

When varnish is stored or displayed on store shelves for an appreciable period of time it sometimes gels and becomes ususuable. This gelation may occur in the absence of any heat or light or oxygen containing atmosphere. I have found that this galation may be substantially prevented by intimately mixing from 0.1 to 1.0 weight percent of certain gelation inhibitors with the alkyd varnish after it has been prepared.

The present invention may be better understood by reference to the following examples, which are not to be construed as limiting.

An alkyd varnish was prepared by cooking 52 parts by weight of bodied soybean oil, 13 parts by weight of dehydrated castor oil, 30 parts by weight of vinyl toluene, 5 parts by weight of divinyl benzene and 0.5 part by weight of ditertiary butyl hydroperoxide at 60 percent solids in odorless mineral spirits for five hours at 160° C. A quantity of 50 cc. of this varnish was placed in a 4 ounce bottle with a 6d. nail and 0.1 gram of solid or 0.1 cc. of liquid of one of the following inhibitors. The bottles were then placed in a glycol bath at 142° F. Viscosity build up was checked visually with the results noted in the following table. A control sample containing no inhibitor and a sample containing 20 p.p.m. of tertiary butyl catechol were run for purposes of comparison.

| Run | Inhibitor | Days | Remarks |
|---|---|---|---|
| 1 | None | 3 | Gel. |
| 2 | Triethylamine | 110 | No gel. |
| 3 | N,N-diisopropyl propargyl amine | 110 | Do. |
| 4 | N,N - dimethyl - 1 - ethynyl - cyclohexylamine. | 110 | Do. |
| 5 | N - (1 - ethynylcyclohexyl) piperidine | 110 | Do. |
| 6 | Dipropylamine tribphenyl borane complex. | 110 | Do. |
| 7 | Triphenyl borane | 110 | Do. |
| 8 | Triethylaminotriphenyl borane | 110 | Do. |
| 9 | Diisopropanol amine | 110 | Do. |
| 10 | Tertiary butyl catechol (20 p.p.m.) | 20 | Gel. |

Various modifications may be made in the present invention without departing from the spirit or scope thereof, and it is understood that I limit myself only as defined in the appended claims.

I claim:
1. A method of inhibiting the gelation of glyceride oil modified vinyl toluene alkyd varnish resins which comprises adding to such varnish resins from 0.1 to 1.0 weight percent of a gelation inhibitor of the group consisting of triethylamine; N,N-diisopropyl propargyl amine; N,N - dimethyl-1-ethynylcyclohexylamine; N-(1-ethynylcyclohexyl)piperidine; dipropylamine triphenyl borane complex; triphenyl borane; triethylaminotriphenyl borane; and diisopropanol amine.

2. The method of claim 1 wherein the inhibitor is triphenyl borane.

3. A composition consisting essentially of a glyceride oil modified vinyl toluene alkyd varnish and from 0.1 to 1.0 weight percent of a gelation inhibitor of the group consisting of triethylamine; N,N-diisoproply propargyl amine; N,N - dimethyl-1-ethynycyclohexylamine; N - (1-ethynylcyclohexyl)piperidine; dipropylamine triphenyl borane complex; triphenyl borane; triethylaminotriphenyl borane; and diisopropanol amine.

4. The composition of claim 3 wherein the inhibitor is triphenyl borane.

References Cited in the file of this patent

UNITED STATES PATENTS

| | | |
|---|---|---|
| 2,840,551 | Field et al. | June 24, 1958 |
| 2,890,186 | Sample | June 9, 1959 |
| 2,912,396 | Schwarcman | Nov. 10, 1959 |
| 2,912,400 | Olson | Nov. 10, 1959 |
| 2,915,486 | Shelley | Dec. 1, 1959 |
| 2,917,543 | Smalley et al. | Dec. 15, 1959 |
| 2,928,796 | Heckles | Mar. 15, 1960 |
| 2,951,867 | Stafiej et al. | Sept. 6, 1960 |